United States Patent
Liao et al.

(10) Patent No.: US 11,487,105 B2
(45) Date of Patent: Nov. 1, 2022

(54) MODIFIED SLOW-SCAN DRIVE SIGNAL

(71) Applicant: Microsoft Technology Licensing, LLC, Redmond, WA (US)

(72) Inventors: Wenjun Liao, Sunnyvale, CA (US); Chuan Pu, Foster City, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 416 days.

(21) Appl. No.: 16/224,730

(22) Filed: Dec. 18, 2018

(65) Prior Publication Data
US 2020/0192083 A1    Jun. 18, 2020

(51) Int. Cl.
| | |
|---|---|
| G02B 26/08 | (2006.01) |
| G02B 26/10 | (2006.01) |
| G02B 27/01 | (2006.01) |
| G09G 3/02 | (2006.01) |

(52) U.S. Cl.
CPC ....... *G02B 26/101* (2013.01); *G02B 26/0833* (2013.01); *G02B 27/0172* (2013.01); *G09G 3/02* (2013.01)

(58) Field of Classification Search
CPC .............. G02B 26/101; G02B 26/0833; G02B 27/0172; G02B 27/0093; G02B 27/017; G02B 27/01; G02B 26/0841; G02B 26/085; G02B 26/0858; G02B 26/0866; G02B 26/105; G02B 26/121; G09G 3/02; H04N 9/3135
USPC ...................................................... 359/198.1
See application file for complete search history.

(56) References Cited

U.S. PATENT DOCUMENTS

| | | |
|---|---|---|
| 7,043,695 B2 | 5/2006 | Elber et al. |
| 7,403,890 B2 | 7/2008 | Roushar |
| 7,492,495 B2 | 2/2009 | Ishihara et al. |
| 7,952,783 B2 | 5/2011 | Holmes et al. |
| 8,107,147 B2 | 1/2012 | Hudman et al. |

(Continued)

FOREIGN PATENT DOCUMENTS

EP    2818909 A1    12/2014

OTHER PUBLICATIONS

Fukutake, et al., "3D Object Layout by Voice Commands Based on Contact Constraints", In International Conference on Computer Graphics, Imaging and Visualization, Jul. 26, 2005, pp. 403-408.

(Continued)

*Primary Examiner* — Thomas K Pham
*Assistant Examiner* — Henry A Duong
(74) *Attorney, Agent, or Firm* — Alleman Hall Creasman & Tuttle LLP

(57) ABSTRACT

A display device, including a display surface, a laser beam emitter, and a processor. The display device may further include a slow-scan MEMS driver configured to drive a slow-scan mirror and a fast-scan MEMS driver configured to drive a fast-scan mirror. The slow-scan mirror and the fast-scan mirror may reflect the laser beam onto an active region of the display surface. The slow-scan period may include a scanning interval in which the slow-scan mirror is configured to move to a final scanning position at one or more scanning ramp rates and a flyback interval in which the slow-scan mirror is configured to return to the initial scanning position. The processor may generate a modified slow-scan drive signal by modifying one or more of the initial scanning position, the final scanning position, and the scanning ramp rate in a blank region of the display surface.

16 Claims, 11 Drawing Sheets

(56) References Cited

U.S. PATENT DOCUMENTS

| | | |
|---|---|---|
| 8,248,541 B2 | 8/2012 | Brown et al. |
| 8,446,342 B2 | 5/2013 | Champion et al. |
| 8,711,186 B2 | 4/2014 | Champion |
| 9,693,029 B1 | 6/2017 | Jackson |
| 9,986,215 B1 | 5/2018 | Tardif et al. |
| 2008/0001850 A1 | 1/2008 | Champion et al. |
| 2014/0125873 A1 | 5/2014 | Nakamura |
| 2018/0004481 A1 | 1/2018 | Fallon |
| 2018/0011531 A1 | 1/2018 | Clement et al. |
| 2018/0046851 A1 | 2/2018 | Kienzle et al. |

OTHER PUBLICATIONS

"International Search Report and Written Opinion Issued in PCT Application No. PCT/US2019/064082", dated Mar. 24, 2020, 26 Pages.

MODIFIED SLOW-SCAN DRIVE SIGNAL

BACKGROUND

Microelectromechanical systems (MEMS) displays may include slow-scan mirrors and fast-scan mirrors. A slow-scan mirror and a fast-scan mirror may form a displayed image by reflecting a laser beam onto a surface. In some MEMS displays, the fast-scan mirror may go through many scanning cycles during a single scanning cycle of the slow-scan mirror, which may move in a direction perpendicular to that of the fast-scan mirror. Thus, the MEMS display may form a two-dimensional image. However, the video frame time is typically not an integer multiple of the length of the fast-scan cycle, and the slow scan cycles need to be adjusted to account for this. This may lead to distortion in the displayed image.

SUMMARY

According to one aspect of the present disclosure, a display device is provided, including a display surface. The display device may further include a laser beam emitter configured to emit a laser beam. The display device may further include a slow-scan microelectromechanical systems (MEMS) driver configured to drive a slow-scan mirror via a slow-scan drive signal with a slow-scan period. The display device may further include a fast-scan MEMS driver configured to drive a fast-scan mirror via a fast-scan drive signal with a fast-scan period. The display device may further include a processor operatively coupled to the fast-scan MEMS driver and slow-scan MEMS driver. The slow-scan mirror and the fast-scan mirror may be configured to reflect the laser beam onto an active region of the display surface during a display interval. The slow-scan period may include a scanning interval in which the slow-scan mirror is configured to move from an initial scanning position to a final scanning position at one or more scanning ramp rates. The slow-scan drive signal may further include a flyback interval in which the slow-scan mirror is configured to return from the final scanning position to the initial scanning position. The fast-scan mirror may be configured to scan the active region. The processor may be configured to generate a modified slow-scan drive signal at least in part by modifying one or more of the initial scanning position, the final scanning position, and the scanning ramp rate in a blank region of the display surface. The modified slow-scan drive signal may not include a substantially instantaneous step change.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors have identified a shortcoming of existing methods of adjusting a slow-scan mirror drive signal to account for the video frame time having a length that is a non-integer multiple of the fast-scan period. According to existing methods, a substantially instantaneous step increase or decrease in the voltage of the slow-scan drive signal is introduced, as discussed in further detail below with reference to FIG. 5. However, such a substantially instantaneous step change may cause the slow-scan mirror to experience vibrations that last into the display region, thus distorting the displayed image. In order to display a clearer image, it would be desirable to adjust the slow-scan drive signal without causing resonance due to vibrations in the slow-scan mirror that last into the display region.

Figure 1:
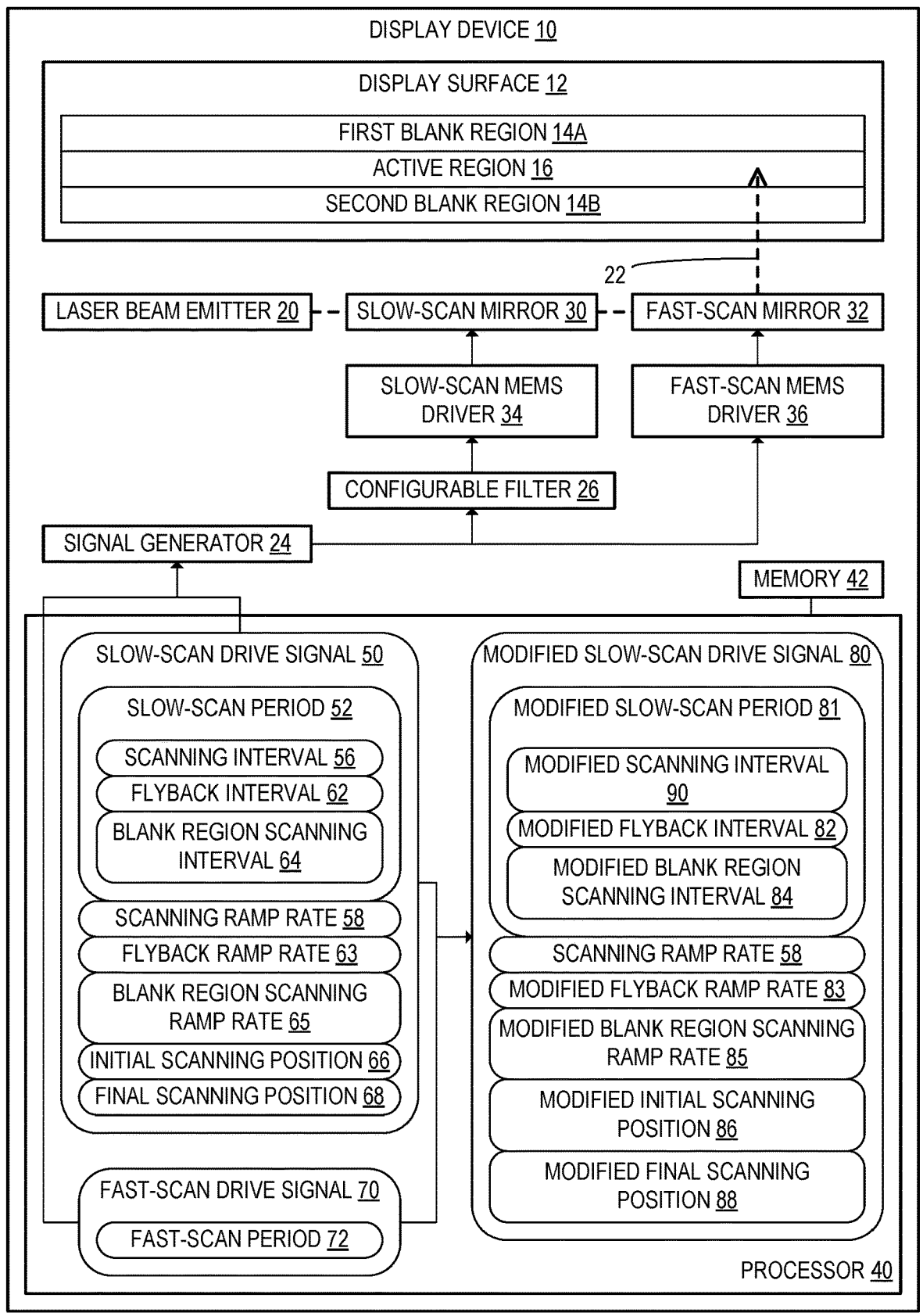
FIG. 1 schematically shows an example display device, according to one embodiment of the present disclosure.
Figure 2:
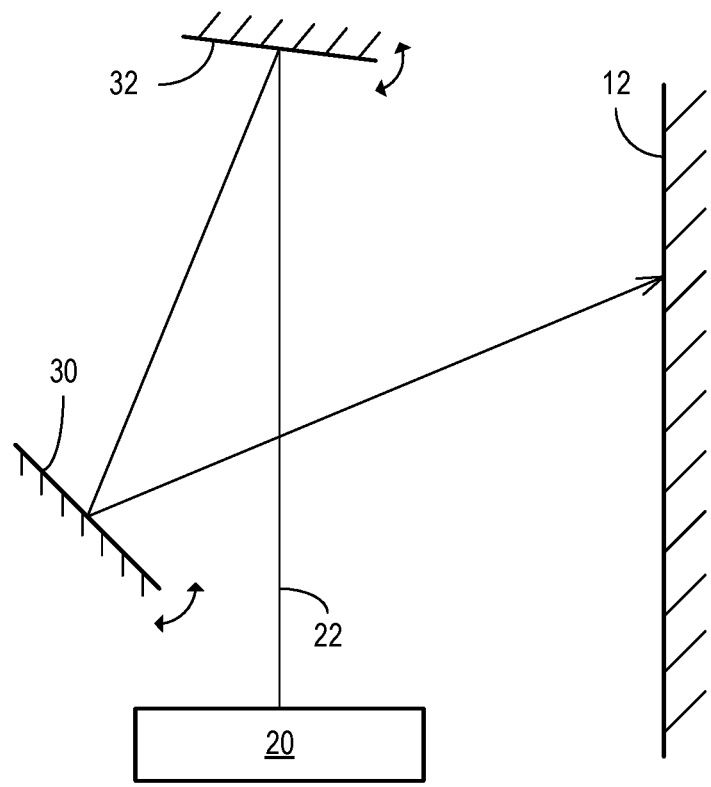
FIG. 2 shows a slow-scan mirror and a fast-scan mirror reflecting a laser beam onto a display surface, according to the embodiment of FIG. 1.

In order to address the problems discussed above, the inventors have conceived of the systems and methods described below. FIG. 1 shows a schematic depiction of an example display device 10, according to one example embodiment. The display device 10 of FIG. 1 may include a display surface 12. The display device 10 may further include a laser beam emitter 20 configured to emit a laser beam 22. For example, the laser beam emitter 20 may be a laser diode. The display device 10 may further include a slow-scan mirror 30 and a fast-scan mirror 32. The slow-scan mirror 30 and the fast-scan mirror 32 may be configured to reflect the laser beam 22 onto the display surface 12, as shown in FIG. 2.

Returning to FIG. 1, the display device 10 may further include a slow-scan microelectromechanical systems (MEMS) driver 34 configured to drive the slow-scan mirror 30 and a fast-scan MEMS driver 36 configured to drive the fast-scan mirror 32, thus causing the slow-scan mirror 30 and the fast-scan mirror 32 to move. As discussed in further detail below, the slow-scan MEMS driver 34 may drive the slow-scan mirror 30 via a slow-scan drive signal 50 with a slow-scan period 52. The fast-scan MEMS driver 36 may drive the fast-scan mirror 32 via a fast-scan drive signal 70 with a fast-scan period 72. The fast-scan period 72 may be much shorter than the slow-scan period 52. For example, the frequency of the slow-scan drive signal 50 may be between 60 Hz and 120 Hz, and in one particular example may be 120 Hz. In contrast, the frequency of the fast-scan drive signal 70 may be between 20 kHz and 50 kHz, and in a more particular example may be between 24 kHz and 29 kHz. Thus, many fast-scan periods 72 may occur within one slow-scan period 52. It will be appreciated that these ranges are merely exemplary and the techniques described herein may be used with fast-scan periods and slow scan periods of other lengths.

The display device 10 may further include a processor 40. The processor 40 may be operatively coupled to memory 42, which may include volatile and/or non-volatile memory. In addition, the processor 40 may be operatively coupled to one or more input devices, output devices, and/or communication devices of the display device 10. The processor 40 may be further configured to execute one or more application programs. The one or more application programs may output one or more images to be displayed on the display surface 12.

The display device 10 may further include a signal generator 24. The signal generator 24 may be configured to output the slow-scan drive signal 50 to the slow-scan MEMS driver 34 and the fast-scan drive signal 70 to the fast-scan MEMS driver 36 respectively. In some embodiments, the signal generator 24 may be configured to output the slow-scan drive signal 50 and the fast-scan drive signal 70 based on respective slow-scan drive signal instructions and fast-scan drive signal instructions received from the processor 40. In some embodiments, the display device 10 may include separate signal generators respectively configured to generate the slow-scan drive signal and the fast-scan drive signal.

The display device 10 may further include a configurable filter 26 configured to filter the slow-scan drive signal 50. For example, the configurable filter 26 may be a low-pass filter. The configurable filter 26 may receive the slow-scan drive signal from the signal generator 24 and output the filtered slow-scan drive signal to the slow-scan MEMS driver 34. Thus, the configurable filter 26 may smooth the slow-scan drive signal 50 by filtering out high-frequency components.

In some embodiments, the slow-scan mirror 30 may be configured to move along a vertical axis of the display surface 12. Additionally, the fast-scan mirror 32 may be configured to move along a horizontal axis of the display surface 12. Alternatively, the slow-scan mirror 30 may be configured to move along the horizontal axis and the fast-scan mirror 32 may be configured to move along the vertical axis. Thus, the slow-scan mirror 30 and the fast-scan mirror 32 may, acting together, "draw" a displayed image on the display surface 12.

In some embodiments, the display surface 12 may include an active region 16 and one or more blank regions 14. The active region 16 may be a region of the display surface 12 onto which the slow-scan mirror 30 and the fast-scan mirror 32 may reflect the laser beam 22 to display the displayed image. The one or more blank regions 14 may be one or more regions of the display surface 12 on which the displayed image is not displayed. In some embodiments, as shown in FIG. 1, the display surface 12 may include a first blank region 14A and a second blank region 14B on opposite sides of the active region 16.

Figure 3:
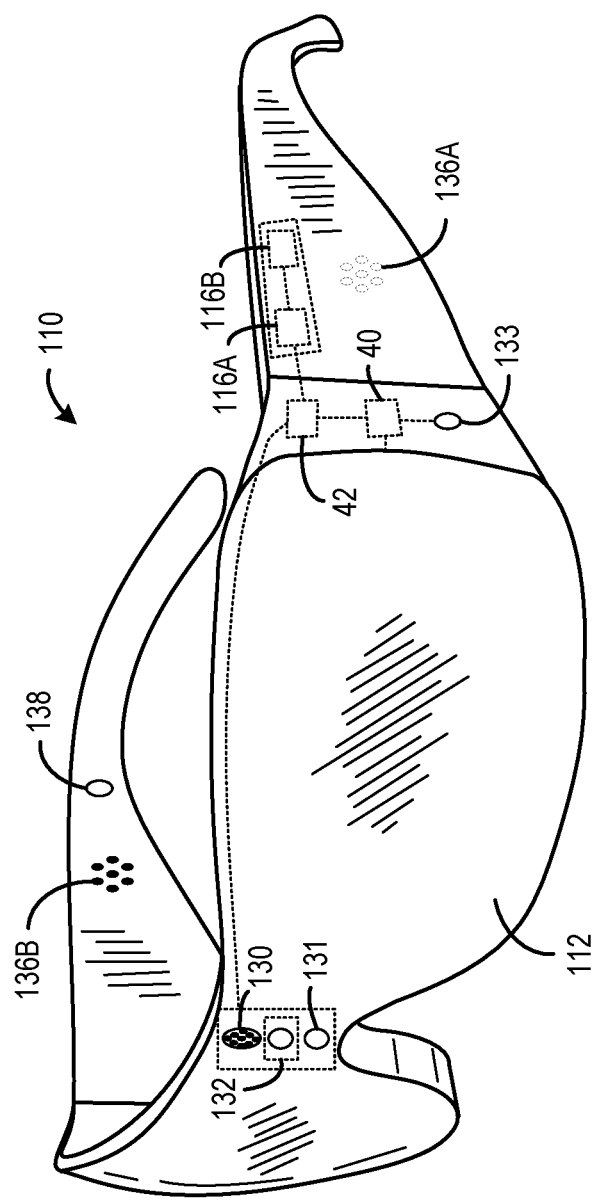
FIG. 3 shows the display device of FIG. 1 in the form of a head-mounted display device.

FIG. 3 shows an example embodiment of the display device 10 in which the display device 10 is a head-mounted display device 110 having the form of wearable glasses or goggles, but it will be appreciated that other forms are possible. The head-mounted display device 110 may include an output device suite including a display 112. In some embodiments, the head-mounted display device 110 may be configured in an augmented reality configuration to present an augmented reality environment, and thus the display 112 may be an at least partially see-through stereoscopic display configured to visually augment an appearance of a physical environment being viewed by the user through the display 112. In some examples, the display 112 may include one or more regions that are transparent (e.g. optically clear) and may include one or more regions that are opaque or semi-transparent. In other examples, the display 112 may be transparent (e.g. optically clear) across an entire usable display surface of the display 112.

The output device suite of the head-mounted display device 110 may, for example, include an image production system that is configured to display one or more virtual objects to the user with the display 112. The processor 40 may be configured to output for display on the display 112 a mixed reality experience including one or more virtual objects superimposed upon the physical environment. In the augmented reality configuration with an at least partially see-through display, the virtual objects are visually superimposed onto the physical environment that is visible through the display 112 so as to be perceived at various depths and locations. In one embodiment, the head-mounted display device 110 may use stereoscopy to visually place a virtual object at a desired depth by displaying separate images of the virtual object to both of the user's eyes. Using this stereoscopy technique, the head-mounted display device 110 may control the displayed images of the virtual objects, such that the user will perceive that the virtual objects exist at a desired depth and location in the viewed physical environment.

Alternatively, the head-mounted display device 110 may be configured in a virtual reality configuration to present a full virtual reality environment, and thus the display 112 may be a non-see-though stereoscopic display. The head-mounted display device 110 may be configured to display virtual three-dimensional environments to the user via the non-see-through stereoscopic display. The head-mounted display device 110 may be configured to display a virtual representation such as a three-dimensional graphical rendering of the physical environment in front of the user that may include additional virtual objects. Displaying the virtual representation of the physical environment may include generating a two-dimensional projection of a three-dimensional model of the physical environment onto the surface of the display 112. As another alternative, the computing system may include a portable computing device that is not head mounted, such as a smartphone or tablet computing device. In such a device, camera-based augmented reality may be achieved by capturing an image of the physical environment through a forward-facing camera and displaying the captured image on a user-facing display along with world locked graphical images superimposed on the captured image. While the computing system is primarily described in terms of the head-mounted display device 110 herein, it will be appreciated that many features of the head-mounted display device 110 are also applicable to such a portable computing device that is not head-mounted.

The output device suite of the head-mounted display device 110 may further include one or more speakers 136 configured to emit sound. In some embodiments, the head-mounted display device 110 may include at least a left speaker 136A and a right speaker 136B situated such that the left speaker 136A may be located proximate the user's left ear and the right speaker 136B may be located proximate the user's right ear when the head-mounted display device 110 is worn. Thus, the one or more speakers 136 may emit stereo sound output. The output device suite may further include one or more haptic feedback devices 138 configured to provide tactile output (e.g. vibration).

The head-mounted display device 110 may include an input device suite including one or more input devices. The input device suite of the head-mounted display device 110 may include one or more optical sensors. In one example, the input device suite includes an outward-facing optical sensor 130 that may be configured to detect the real-world background from a similar vantage point (e.g., line of sight) as observed by the user through the display 112 in an augmented reality configuration. The input device suite may additionally include an inward-facing optical sensor 131 that may be configured to detect a gaze direction of the user's eyes. It will be appreciated that the outward facing optical sensor 130 and/or the inward-facing optical sensor 131 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The input device suite of the head-mounted display device 110 may further include a position sensor system that may include one or more position sensors 132 such as accelerometer(s), gyroscope(s), magnetometer(s), global positioning system(s), multilateration tracker(s), and/or other sensors that output position data as a position, orientation, and/or movement of the relevant sensor. The input device suite may further include one or more microphones 133 configured to collect sound data.

Optical sensor information received from the one or more optical sensors and/or position data received from position sensors 132 may be used to assess a position and orientation of the vantage point of head-mounted display device 110 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined by the processor 40 of the head-mounted display device 110 and/or by an off-board computing system.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location. The virtual model is a three-dimensional model and may be referred to as "world space," and may be contrasted with the projection of world space viewable on the display 112, which is referred to as "screen space." Additionally, the optical sensor information received from the one or more optical sensors may be used to identify and track objects in the field of view of the one or more optical sensors. The optical sensors may also be used to identify machine recognizable visual features in the physical environment and use the relative movement of those features in successive frames to compute a frame to frame relative pose change for the head mounted display device 110 within the world space of the virtual model.

The head-mounted display device 110 may further include a communication system including one or more communication devices 116, which may include one or more receivers 116A and/or one or more transmitters 116B. In embodiments in which the head-mounted display device 110 communicates with an off-board computing system, the one or more receivers 116A may be configured to receive data from the off-board computing system, and the one or more transmitters 116B may be configured to send data to the off-board computing system. In some embodiments, the head-mounted display device 110 may communicate with the off-board computing system via a network, which may be a wireless local- or wide-area network. Additionally or alternatively, the head-mounted display device 110 may communicate with the off-board computing system via a wired connection. The head-mounted display device 110 may be further configured to communicate with a server computing system via the communication system.

Figure 4:
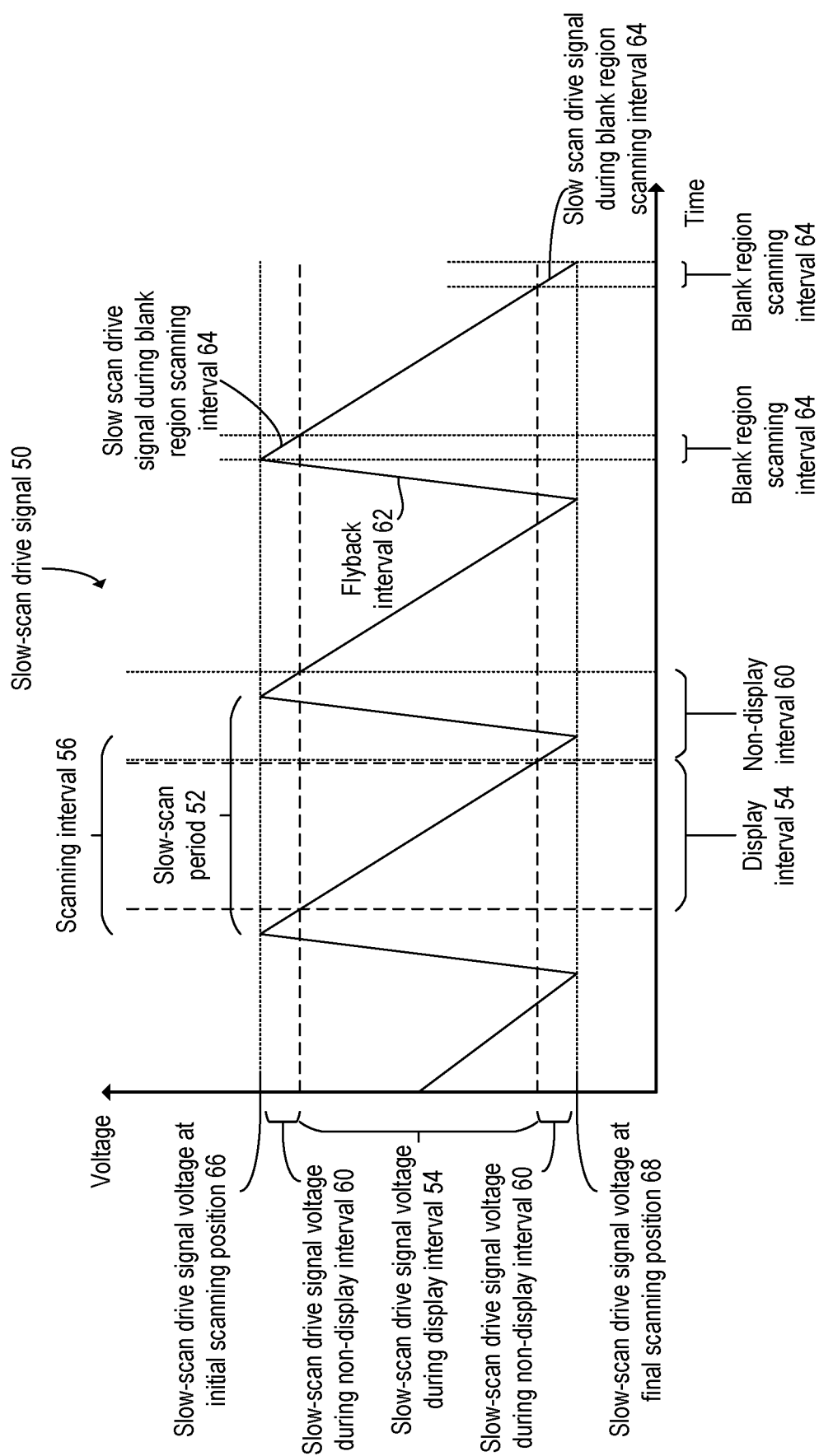
FIG. 4 shows an example plot of the voltage of a slow-scan drive signal as a function of time, according to the embodiment of FIG. 1.

FIG. 4 shows an example plot of the voltage of the slow-scan drive signal 50 as a function of time. As shown in FIG. 4, each slow-scan period 52 may include a display interval 54 and a non-display interval 60. During the display interval 54, the slow-scan mirror 30 and the fast-scan mirror 32 may reflect the laser beam 22 onto the active region 16 of the display surface 12. During the non-display interval 60, the slow-scan mirror 30 and/or the fast-scan mirror 32 may be positioned such that the laser beam 22 is not reflected onto the display surface 12. Additionally or alternatively, the laser beam emitter 20 may not emit the laser beam 22 during the non-display interval.

During the display interval 54, the fast-scan mirror 32 may be configured to scan the active region 16 of the display surface 12. Thus, as discussed above, the slow-scan mirror 30 and the fast-scan mirror 32 may "draw" the displayed image on the active region 16.

The slow-scan period 52 may include a scanning interval 56 in which the slow-scan mirror 30 is configured to move from an initial scanning position 66 to a final scanning position 68. The display interval 54 may be included in the scanning interval 56. During the scanning interval 56, the slow-scan mirror 30 may move from the initial scanning position 66 to the final scanning position 68 at a scanning ramp rate 58. In some embodiments, the initial scanning position 66 and/or the final scanning position 68 may be located in a first blank region 14A and a second blank region 14B respectively. The slow-scan mirror 30 may move from the initial scanning position 66 to the final scanning position 68 at a plurality of different scanning ramp rates 58 over the course of the scanning interval 56 in some embodiments.

The slow-scan period 52 may further include a non-display interval 60. The non-display interval 60 may include a flyback interval 62 in which the slow-scan mirror 30 is configured to return from the final scanning position 68 to the initial scanning position 66. During the flyback interval 62, the slow-scan mirror 30 may move at a flyback ramp rate 63. In some embodiments, the slow-scan mirror 30 may move at a plurality of flyback ramp rates 63 over the course of the flyback interval 62. For example, the slow-scan mirror 30 may undergo a smooth change in the flyback ramp rate 63. In addition, the non-display interval may include one or more blank region scanning intervals 64. In each of the one or more blank region scanning intervals 64, the slow-scan mirror 30 may move away from the initial scanning position 66 toward the final scanning position 68 while scanning a blank region 14 of the display surface 12. In other words, the one or more blank region scanning intervals 64 may be one or more intervals other than the flyback interval 62 that occur during the non-display interval 60.

The processor 40 may be configured to determine that a length of the slow scan period 52 is a non-integer multiple of the fast-scan period 72 of the fast-scan drive signal 70. For example, the processor 40 may receive respective measurements of the positions of the slow-scan mirror 30 and the fast-scan mirror 32 in some embodiments. The ratio of the scanning interval 56 to the fast-scan period 72 may change over time due to, for example, changes in air temperature, pressure, and/or humidity, and/or wear and tear on the display device 10. Thus, it may be desirable to perform occasional measurements of the scanning interval 56 and the fast-scan period 72. In some embodiments, the processor 40 may receive the measurements at a predetermined time interval. Based on the determination that the length of the slow scan period 52 is a non-integer multiple of the fast-scan period 72, the processor 40 may be configured to generate a modified slow-scan drive signal 80 so that the length of the modified slow scan period 81 is an integer multiple of the fast-scan period 72. The processor 40 may generate instructions encoding the modified slow-scan drive signal 80, which may be transmitted to the signal generator 24.

Figure 5:
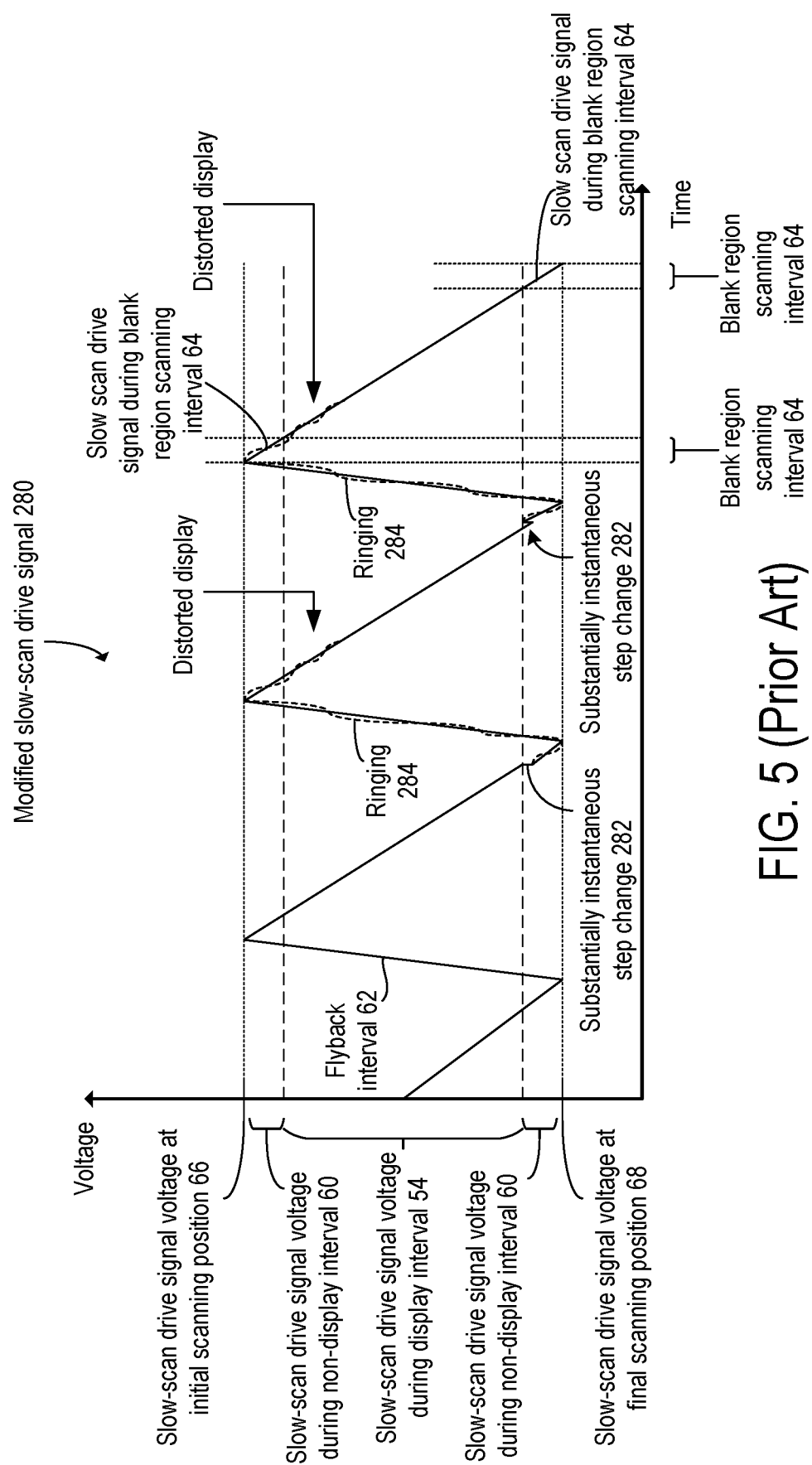
FIG. 5 shows an example plot of a modified slow-scan drive signal including a substantially instantaneous step change, according to the embodiment of FIG. 4.

FIG. 5 shows a modified slow-scan drive signal 280 as generated by prior art display devices. As shown in FIG. 5, the modified slow-scan drive signal 280 may include a substantially instantaneous step change 282. The substantially instantaneous step change 282 is "substantially instantaneous" in that it has a duration much shorter than the slow-scan period 52. For example, the substantially instantaneous step change may be between one and four orders of magnitude shorter than the slow-scan period 52 in some embodiments. The substantially instantaneous step change 282 may be a substantially instantaneous increase or decrease in the voltage of the modified slow-scan drive signal 280. Following the substantially instantaneous step change 282, the ramp rate of the modified slow-scan drive signal 282 may return to the previous value it had prior to the substantially instantaneous step change 282.

However, when the modified slow-scan drive signal 280 has one or more instantaneous step changes 282, as shown in FIG. 5, the one or more substantially instantaneous step changes 282 may cause ringing 284 in the slow-scan mirror 30. The ringing 284 is a vibration in the slow-scan mirror 30 that occurs when the substantially instantaneous step change 282 occurs at or near a resonant frequency of the slow-scan mirror 30. If the ringing 284 persists into the scanning interval 56, the displayed image may be distorted.

Figure 6A:
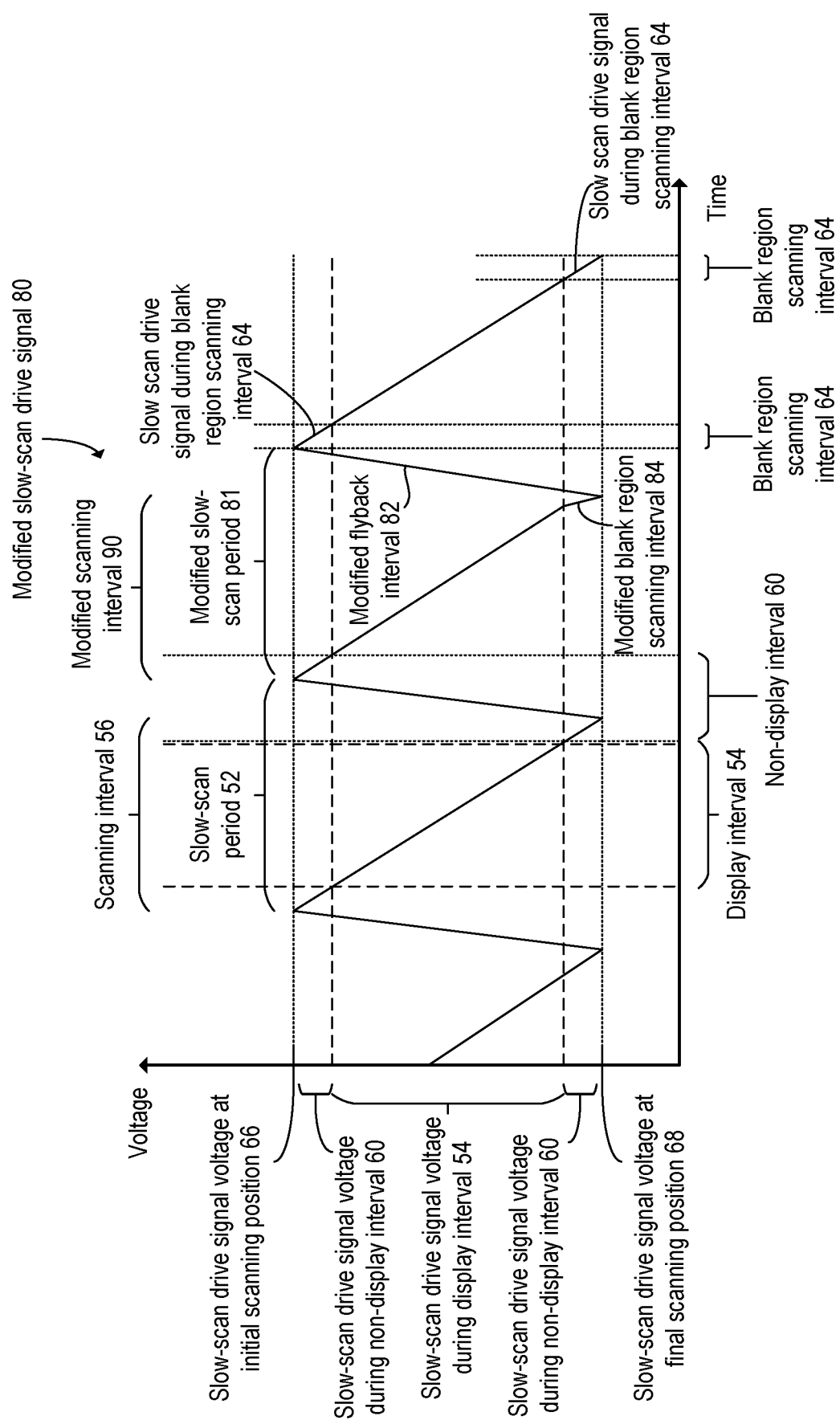
FIGS. 6A-B show example plots of modified slow-scan drive signals including modified blank region scanning intervals, according to the embodiment of FIG. 4.
Figure 6B:
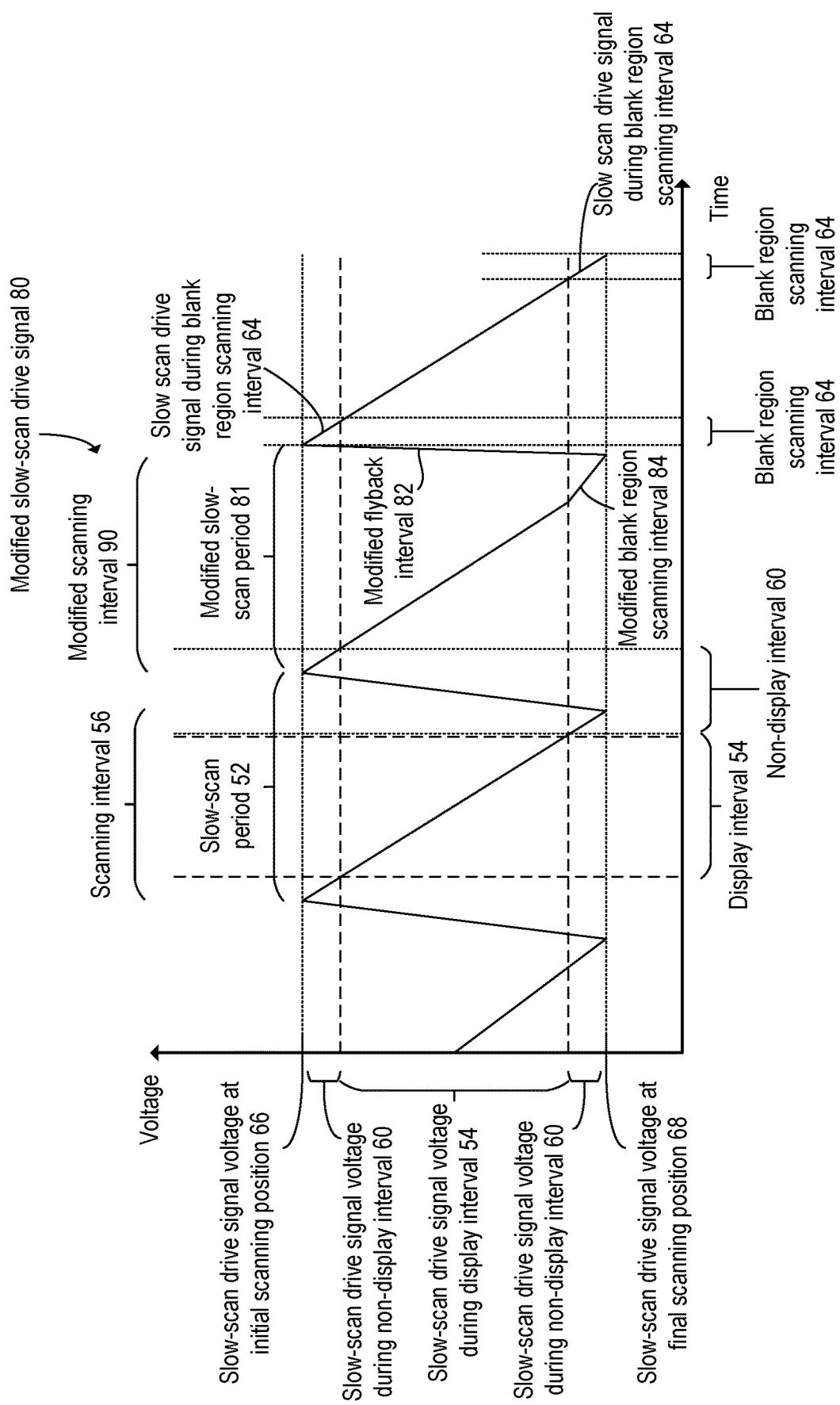

In view of the shortcomings of modifying the slow-scan drive signal 50 with one or more substantially instantaneous step changes 282, alternative modifications to the slow-scan drive signal 50 are discussed below with reference to FIGS. 6A-D. As shown in FIGS. 6A-B, the processor 40 may be configured to generate the modified slow-scan drive signal 80 at least in part by modifying the blank region scanning ramp rate 65 at which the slow-scan mirror 30 scans the one or more blank region 14 of the display surface 12. In FIG. 6A, the modified blank region scanning ramp rate 85 is faster than the blank region scanning ramp rate 65 of the unmodified slow-scan drive signal 50. Alternatively, as shown in FIG. 6B, the modified blank region scanning ramp rate 85 may be slower than the blank region scanning ramp rate 65 of the unmodified slow-scan drive signal 50. Thus, the modified slow-scan drive signal 80 may have a modified blank region scanning interval 84 that is longer or shorter than the unmodified blank region scanning interval 64.

Although the modification to the blank region scanning ramp rate 65 occurs in the second blank region 14B in the embodiments of FIGS. 6A-B, the modification to the blank region scanning ramp rate 65 may additionally or alternatively occur in the first blank region 14A in other embodiments. Although the blank region scanning ramp rate 65 is modified in FIGS. 6A-B, the modified slow-scan drive signals 80 do not include a substantially instantaneous step change 282. Instead, the modified blank region scanning ramp rate 85 may be maintained until flyback begins. In other embodiments, the modified blank region scanning ramp rate 85 may be maintained for only a portion of the modified blank region scanning interval 84, but for more than a substantially instantaneous period of time. The modified slow-scan drive signal may, in some embodiments, have a plurality of modified blank region scanning ramp rates 85. For example, the modified slow-scan drive signal 80 may undergo a smooth increase or decrease in the blank region scanning ramp rate 65. In such embodiments, the modification to the blank region scanning ramp rate 65 may be smoothed by a configurable filter 26. Additionally or alternatively, the processor 40 may be further configured to generate the modified slow-scan drive signal 80 at least in part by modifying the one or more flyback ramp rates 63. In the example of FIG. 6B, the modified flyback ramp rate 83 is faster than the unmodified flyback ramp rate 63.

Figure 6C:
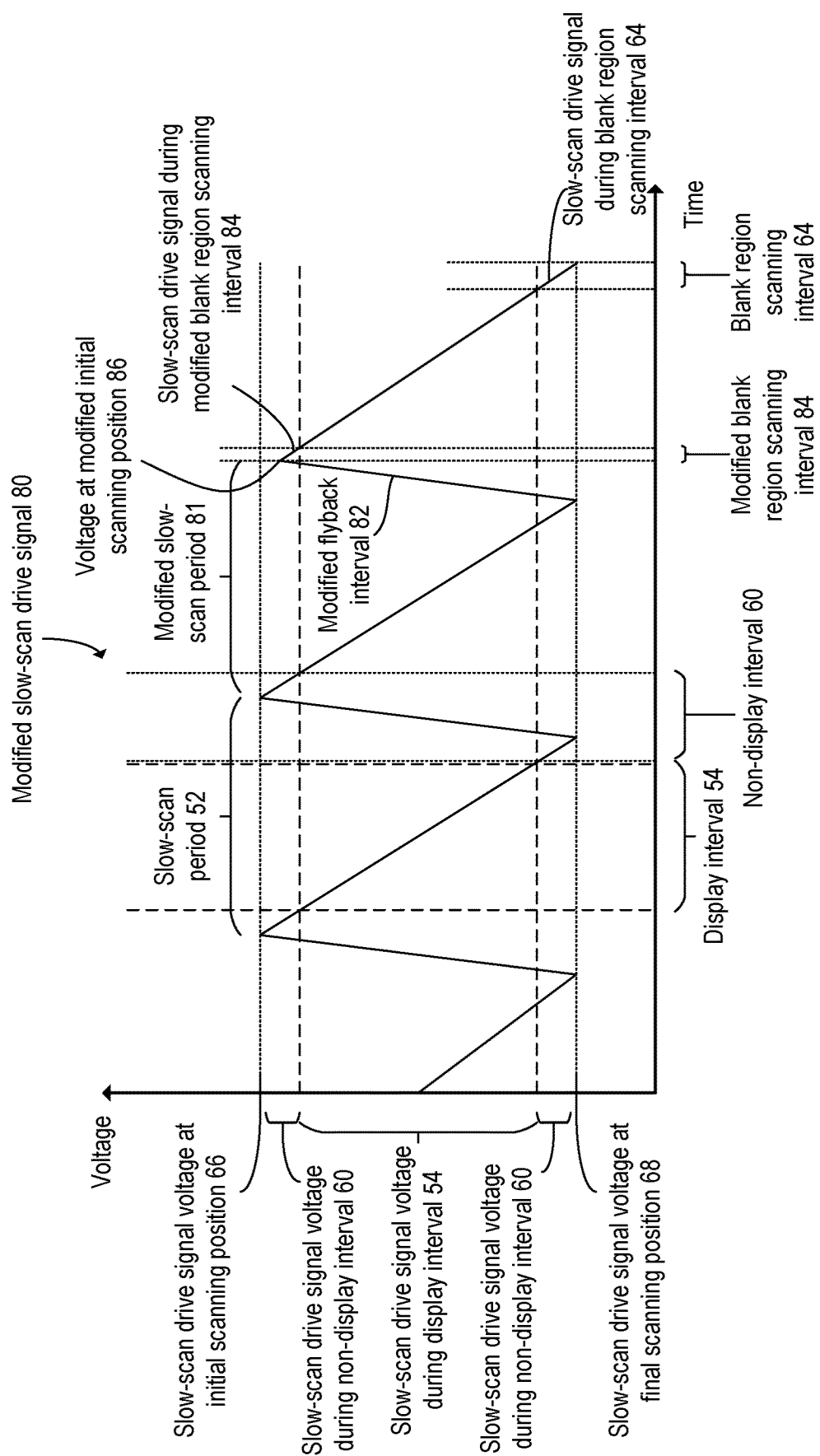
FIG. 6C shows an example plot of a modified slow-scan drive signal including a modified initial scanning position, according to the embodiment of FIG. 4.
Figure 6D:
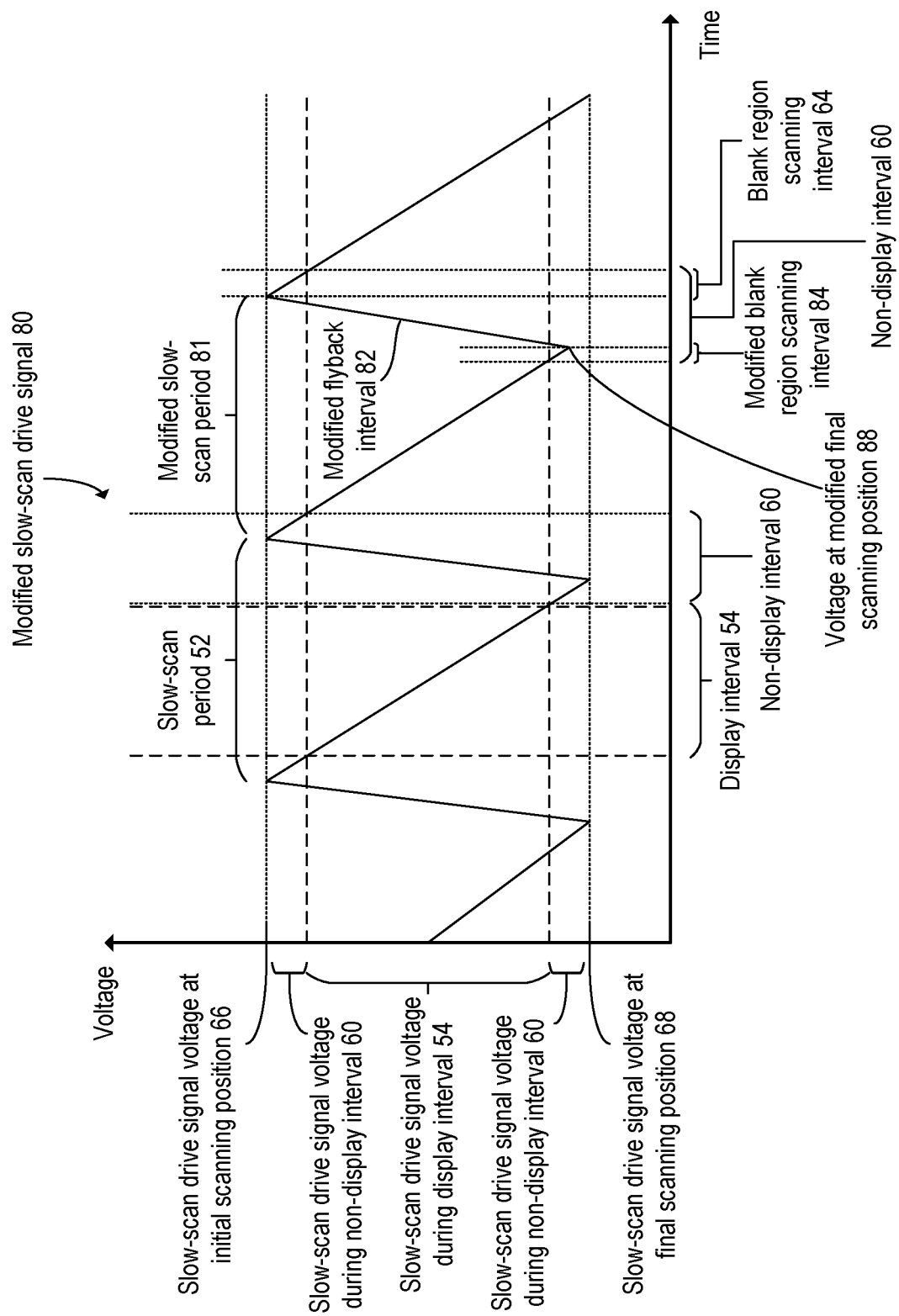
FIG. 6D shows an example plot of a modified slow-scan drive signal including a modified final scanning position, according to the embodiment of FIG. 4.

FIGS. 6C-D respectively show modified slow-scan drive signals 80 in which the initial scanning position 66 and the final scanning position 68 of the slow-scan mirror 30 are modified. The initial scanning position 66 and/or the final scanning position 68 may be modified by changing a maximum or minimum voltage of the slow-scan drive signal 50 during at least one slow-scan period 52. In the example of FIG. 6C, the voltage of the modified slow-scan drive signal 80 at the modified initial scanning position 86 is lower than the voltage at the unmodified initial scanning position 66. In the example of FIG. 6D, the voltage of the modified slow-scan drive signal 80 at the modified final scanning position 88 is higher than the voltage at the unmodified final scanning position 68. In other embodiments, the voltage at the modified initial scanning position 86 may be increased and/or the voltage at the modified final scanning position 88 may be decreased. Thus, the slow-scan mirror 30 may respectively spend a decreased or increased amount of time pointed toward the blank region 14.

When the processor 40 modifies the initial scanning position 66 and/or the final scanning position 68, the processor 40 may be further configured to generate the modified slow-scan drive signal 80 at least in part by modifying a length of the flyback interval 62. FIGS. 6C-D each show a modified flyback interval 82 shorter than the flyback interval 62. In other embodiments, the modified flyback interval 82 may be longer than the flyback interval 62. When the modified blank region scanning ramp rate 85 is higher than the blank region scanning ramp rate 65, as in FIG. 6A the modified flyback interval 82 may be lengthened and the modified flyback ramp rate 83 may be decreased. Similarly, when the modified blank region scanning ramp rate 85 is lower than the blank region scanning ramp rate 65, as in FIG. 6B, the modified flyback interval 82 may be shortened and the modified flyback ramp rate 83 may be increased.

Thus, the modified slow-scan period 81 may be held to be an integer multiple of the fast-scan period.

Thus, using the modifications shown in FIGS. 6A-D and discussed above, the processor 40 may be configured to generate a modified slow-scan drive signal 80 with a modified slow scan period 81 that is an integer multiple of the fast-scan period 72. This integer multiple could be slightly different for each frame in a series of successive frames during implementation, but the average frame rate over many frames is controlled to be the same as the incoming video frame rate (e.g., 120 Hz). The modified slow-scan drive signal 80 may have the modified slow-scan period 81. Modifying the slow-scan period 52 to generate a modified slow scan period 81 that is an integer multiple of fast-scan period 72 ensures superior display image quality as the fast-scan and slow scan mirrors are synchronized for the active display regions.

Figure 7A:
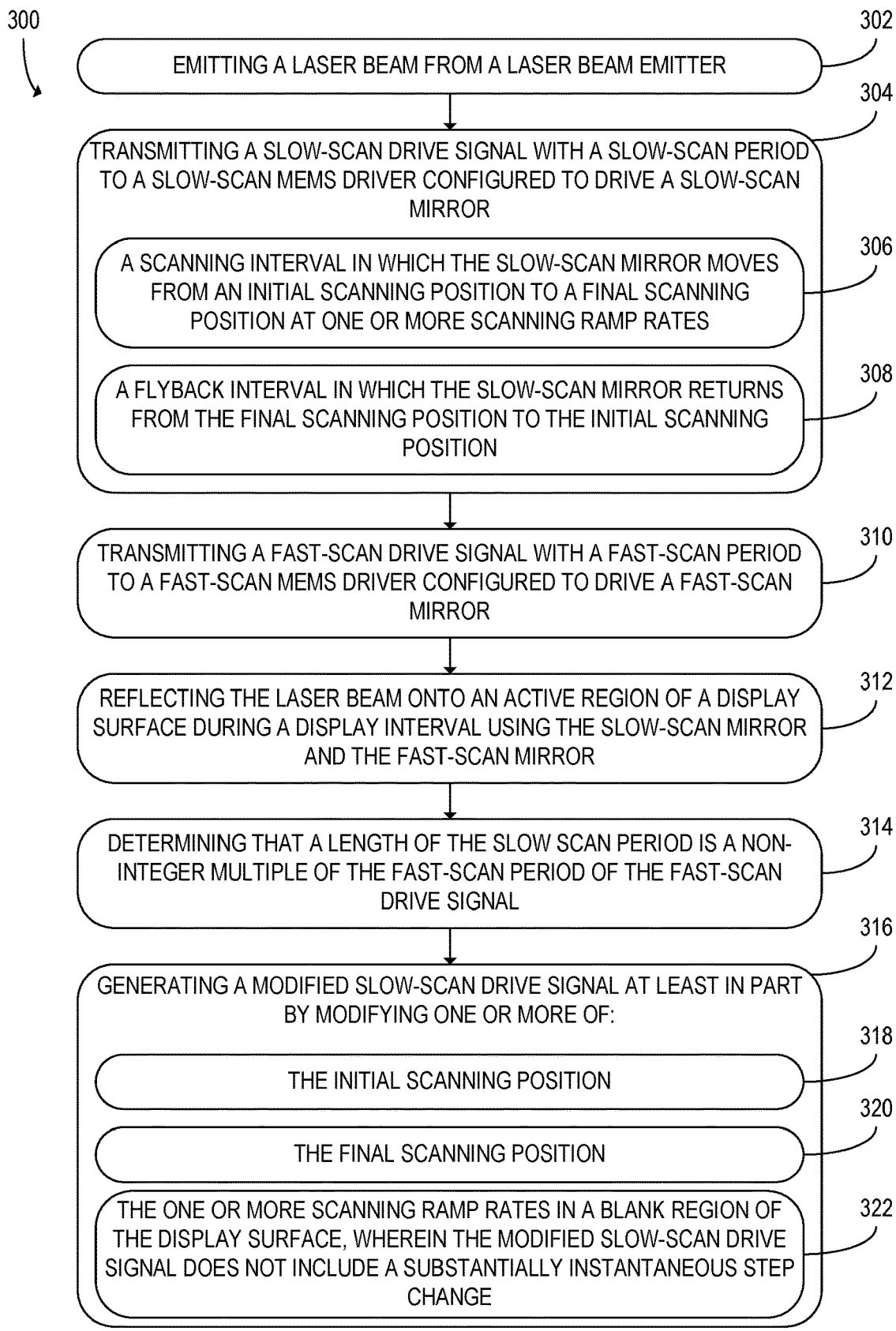
FIG. 7A shows a flowchart of an example method for use with a display device, according to the embodiment of FIG. 1.

FIG. 7A shows a flowchart of a method 300 for use with a display device. The display device with which the method 300 is used may be the display device 10 of FIG. 1 or may alternatively be some other display device. At step 302, the method 300 may include emitting a laser beam from a laser beam emitter. For example, the laser beam emitter may be a laser diode. The laser beam emitter may have a display interval during which the laser beam is emitted and a non-display interval during which the laser beam is not emitted. At step 304, the method 300 may further include transmitting a slow-scan drive signal with a slow-scan period to a slow-scan MEMS driver configured to drive a slow-scan mirror. The slow-scan period may include, at step 306, a scanning interval in which the slow-scan mirror moves from an initial scanning position to a final scanning position at one or more scanning ramp rates. The display interval of the laser beam emitter may be included in the scanning interval. The slow-scan period may further include, at step 308, a flyback interval in which the slow-scan mirror returns from the final scanning position to the initial scanning position. The slow-scan mirror may return to the initial scanning position at one or more flyback ramp rates, and may return during the non-display interval of the laser beam emitter. In some embodiments, the display surface may include an active region on which an image is displayed and one or more blank regions on which the image is not displayed. In such embodiments, the initial scanning position and/or the final scanning position may be located in the one or more blank regions.

At step 310, the method 300 may further include transmitting a fast-scan drive signal with a fast-scan period to a fast-scan MEMS driver configured to drive a fast-scan mirror. The slow-scan drive signal and the fast-scan drive signal may be generated by one or more signal generators. In some embodiments, the slow-scan drive signal and the fast-scan drive signal may be generated by the same signal generator, whereas in other embodiments they may be generated by separate signal generators. At step 312, the method 300 may further include reflecting the laser beam onto the active region of a display surface during the display interval using the slow-scan mirror and the fast-scan mirror.

The method 300 may further include, at step 314, determining that a length of the slow scan period is a non-integer multiple of the fast-scan period of the fast-scan drive signal. This determination may be made at a processor of the display device. In response to this determination, at step 316, the method 300 may further include generating a modified slow-scan drive signal. The modified slow-scan drive signal may be generated at least in part by modifying the initial scanning position, as shown at step 318. Additionally or alternatively, as shown at step 320, the modified slow-scan drive signal may be generated at least in part by modifying the final scanning position. As shown at step 322, the modified slow-scan drive signal may additionally or alternatively be generated at least in part by modifying the scanning ramp rate in a blank region of the display surface. The modified slow-scan drive signal may not include a substantially instantaneous step change. In some embodiments, the modified slow-scan drive signal may have a modified slow scan period 81 with a length equal to an integer multiple of the fast-scan period.

Figure 7B:
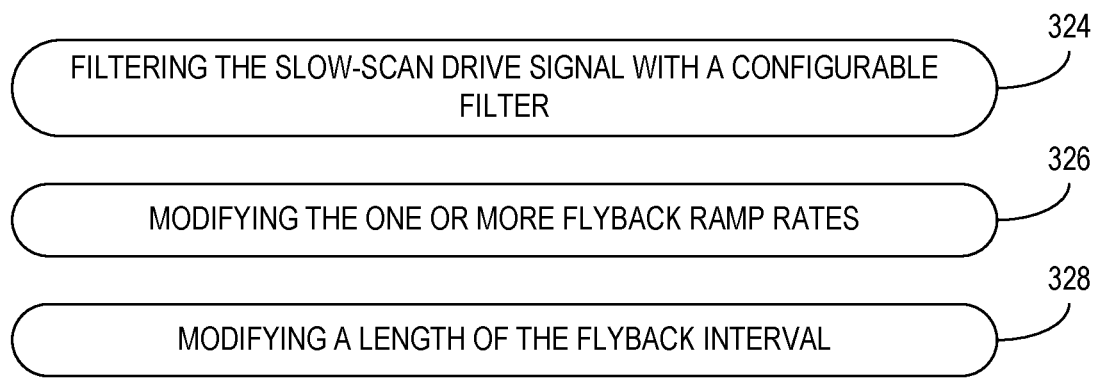
FIG. 7B shows additional steps that may optionally be performed when performing the method of FIG. 7A.

FIG. 7B shows additional steps that may be performed in some embodiments as part of the method 300. At step 324, the method 300 may include filtering the slow-scan drive signal with a low-pass filter. The low-pass filter may receive the slow-scan drive signal from the signal generator and output the filtered slow-scan drive signal to the slow-scan MEMS driver. The modified slow-scan drive signal may be filtered similarly to the slow-scan drive signal.

At step 326, generating the modified slow-scan drive signal may further include modifying the one or more flyback ramp rates. Additionally or alternatively, generating the modified slow-scan drive signal may further include modifying a length of the flyback interval. Changes in the flyback ramp rate and/or the length of the flyback interval may be combined with changes in the initial scanning position, the final scanning position, and/or the scanning ramp rate in the blank area of the display surface.

Using the systems and methods described above, the slow-scan drive signal may be modified to account for the slow-scan period having a length that is a non-integer multiple of the fast-scan period. The above systems and methods allow the slow-scan drive signal to be modified without causing distortion in the displayed image due to resonance between the slow-scan mirror and the modification to the drive signal. Thus, the above systems and methods represent an improvement over existing methods of modifying a slow-scan mirror drive signal.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
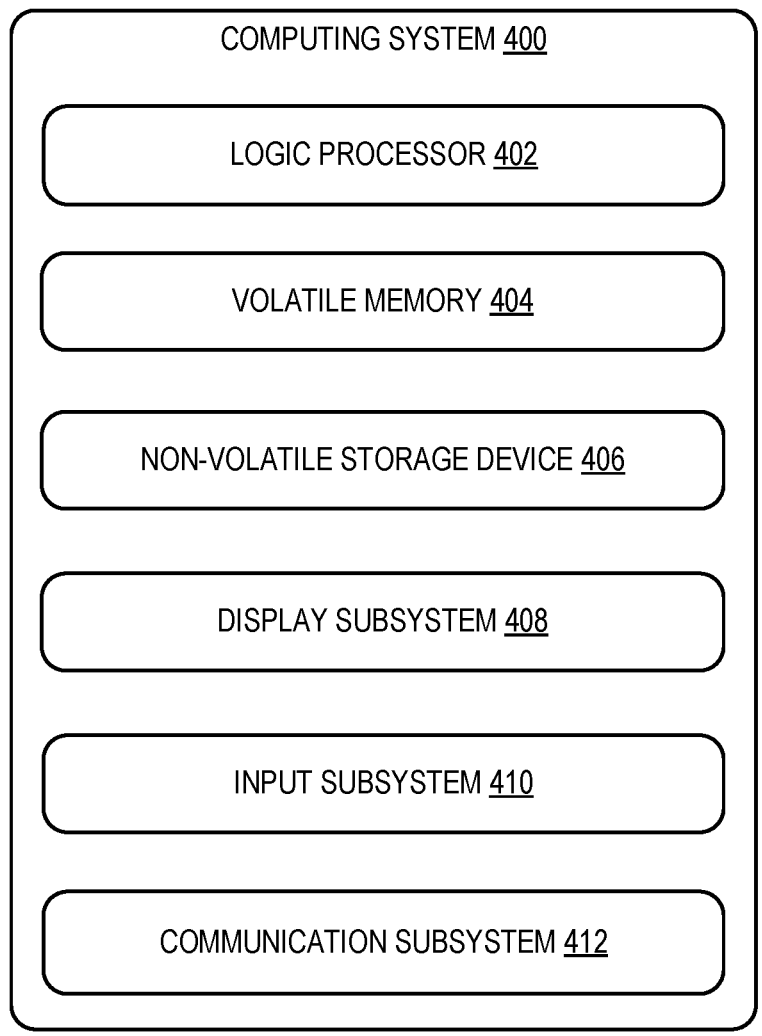
FIG. 8 shows a schematic view of an example computing environment in which the display device of FIG. 1 may be enacted.

FIG. 8 schematically shows a non-limiting embodiment of a computing system 400 that can enact one or more of the methods and processes described above. Computing system 400 is shown in simplified form. Computing system 400 may embody the display device 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 8.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404.

It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a display device is provided, including a display surface, a laser beam emitter configured to emit a laser beam, a slow-scan microelectromechanical systems (MEMS) driver configured to drive a slow-scan mirror via a slow-scan drive signal with a slow-scan period, a fast-scan MEMS driver configured to drive a fast-scan mirror via a fast-scan drive signal with a fast-scan period, and a processor operatively coupled to the fast-scan MEMS driver and slow-scan MEMS driver. The slow-scan mirror and the fast-scan mirror may be configured to reflect the laser beam onto an active region of the display surface during a display interval. The slow-scan period may include a scanning interval in which the slow-scan mirror is configured to move from an initial scanning position to a final scanning position at one or more scanning ramp rates and a flyback interval in which the slow-scan mirror is configured to return from the final scanning position to the initial scanning position. The fast-scan mirror may be configured to scan the active region. The processor may be configured to generate a modified slow-scan drive signal at least in part by modifying one or more of the initial scanning position, the final scanning position, and the one or more scanning ramp rates in a blank region of the display surface. The modified slow-scan drive signal may not include a substantially instantaneous step change.

According to this aspect, the flyback interval may be traversed at one or more flyback ramp rates. The processor may be further configured to generate the modified slow-scan drive signal at least in part by modifying the one or more flyback ramp rates.

According to this aspect, the processor may be further configured to generate the modified slow-scan drive signal at least in part by modifying a length of the flyback interval.

According to this aspect, the slow-scan mirror may be configured to move along a vertical axis and the fast-scan mirror may be configured to move along a horizontal axis.

According to this aspect, the display device may further include a signal generator configured to output the slow-scan drive signal to the slow-scan MEMS driver and the fast-scan drive signal to the fast-scan MEMS driver respectively. According to this aspect, the signal generator may be configured to output the slow-scan drive signal and the fast-scan drive signal based on respective slow-scan drive signal instructions and fast-scan drive signal instructions received from the processor. According to this aspect, the display device may further include a configurable filter configured to filter the slow-scan drive signal.

According to this aspect, the modified slow-scan drive signal may have the slow-scan period.

According to this aspect, the display device may be a head-mounted display device.

According to this aspect, the processor may be further configured to determine that a length of the slow scan period is a non-integer multiple of the fast-scan period of the fast-scan drive signal. The processor may be further configured to generate the modified slow-scan drive signal in response to the determination. According to this aspect, the modified slow-scan drive signal may have a modified slow scan period with a length equal to an integer multiple of the fast-scan period.

According to this aspect, the display surface may include a first blank region and a second blank region on opposite sides of the active region.

According to another aspect of the present disclosure, a method for use with a display device, the method including emitting a laser beam from a laser beam emitter. The method may further include transmitting a slow-scan drive signal with a slow-scan period to a slow-scan microelectromechanical systems (MEMS) driver configured to drive a slow-scan mirror. The method may further include transmitting a fast-scan drive signal with a fast-scan period to a fast-scan MEMS driver configured to drive a fast-scan mirror. The method may further include reflecting the laser beam onto an active region of a display surface during a display interval using the slow-scan mirror and the fast-scan mirror. The slow-scan period may include a scanning interval in which the slow-scan mirror moves from an initial scanning position to a final scanning position at one or more scanning ramp rates. The slow-scan period may further include a flyback interval in which the slow-scan mirror returns from the final scanning position to the initial scanning position. The method may further include, at a processor, generating a modified slow-scan drive signal at least in part by modifying one or more of the initial scanning position, the final scanning position, and the one or more scanning ramp rates in a blank region of the display surface. The modified slow-scan drive signal may not include a substantially instantaneous step change.

According to this aspect, the flyback interval may be traversed at one or more flyback ramp rates. Generating the modified slow-scan drive signal may include modifying the one or more flyback ramp rates.

According to this aspect, generating the modified slow-scan drive signal may include modifying a length of the flyback interval.

According to this aspect, the method may further include filtering the slow-scan drive signal with a configurable filter.

According to this aspect, the modified slow-scan drive signal may have the slow-scan period.

According to this aspect, the method may further include determining that a length of the slow scan period is a non-integer multiple of the fast-scan period of the fast-scan drive signal. The method may further include generating the modified slow-scan drive signal in response to the determination. According to this aspect, the modified slow-scan drive signal may have a modified slow scan period with a length equal to an integer multiple of the fast-scan period.

According to another aspect of the present disclosure, a display device is provided, including a display surface, a laser beam emitter configured to emit a laser beam, a slow-scan microelectromechanical systems (MEMS) driver configured to drive a slow-scan mirror via a slow-scan drive signal with a slow-scan period, a fast-scan MEMS driver configured to drive a fast-scan mirror via a fast-scan drive signal with a fast-scan period, and a processor operatively coupled to the fast-scan MEMS driver and slow-scan MEMS driver. The slow-scan mirror and the fast-scan mirror may be configured to reflect the laser beam onto an active region of the display surface during a display interval. The slow-scan period may include a scanning interval in which the slow-scan mirror is configured to move from an initial scanning position to a final scanning position at one or more scanning ramp rates and a flyback interval in which the slow-scan mirror is configured to return from the final scanning position to the initial scanning position. The fast-scan mirror may be configured to scan the active region. The processor may be configured to generate a modified slow-scan drive signal at least in part by modifying one or more of the initial scanning position and the final scanning position. The initial scanning position may be located in a first blank region on a first side of the active region and the final scanning position may be located in a second blank region on a second side of the active region opposite the first side.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
a display surface;
a laser beam emitter configured to emit a laser beam;
a slow-scan microelectromechanical systems (MEMS) driver configured to drive a slow-scan mirror via a slow-scan drive signal with a slow-scan period during a first slow-scan interval;
a fast-scan MEMS driver configured to drive a fast-scan mirror via a fast-scan drive signal with a fast-scan period; and
a processor operatively coupled to the fast-scan MEMS driver and slow-scan MEMS driver;
wherein:
the slow-scan mirror and the fast-scan mirror are configured to reflect the laser beam onto an active region of the display surface during a display interval;
the first slow-scan interval includes:
a scanning interval in which the slow-scan mirror is configured to move from an initial scanning position to a final scanning position at one or more scanning ramp rates; and
a flyback interval in which the slow-scan mirror is configured to return from the final scanning position to the initial scanning position;
the fast-scan mirror is configured to scan the active region; and
the processor is configured to:
generate a modified slow-scan drive signal at least in part by modifying one or more of:
the initial scanning position;
the final scanning position; and
the one or more scanning ramp rates in a blank region of the display surface, wherein:
the modified slow-scan drive signal has a same slow-scan period as the slow-scan drive signal; and
the modified slow-scan drive signal does not include a substantially instantaneous step change; and
output, to the slow-scan MEMS driver, instructions to drive the slow-scan mirror with the modified slow-scan drive signal during a second slow-scan interval that occurs subsequently to the first slow-scan interval during operation of the slow-scan MEMS driver, wherein the first slow-scan interval and the second slow-scan interval occur during respective successive frames of a series of frames.

2. The display device of claim 1, wherein the flyback interval is traversed at one or more flyback ramp rates, and the processor is further configured to generate the modified slow-scan drive signal at least in part by modifying the one or more flyback ramp rates.

3. The display device of claim 1, wherein the processor is further configured to generate the modified slow-scan drive signal at least in part by modifying a length of the flyback interval.

4. The display device of claim 1, wherein the slow-scan mirror is configured to move along a vertical axis and the fast-scan mirror is configured to move along a horizontal axis.

5. The display device of claim 1, further comprising a signal generator configured to output the slow-scan drive signal to the slow-scan MEMS driver and the fast-scan drive signal to the fast-scan MEMS driver respectively.

6. The display device of claim 5, wherein the signal generator is configured to output the slow-scan drive signal and the fast-scan drive signal based on respective slow-scan drive signal instructions and fast-scan drive signal instructions received from the processor.

7. The display device of claim 5, further comprising a configurable filter configured to filter the slow-scan drive signal.

8. The display device of claim 1, wherein the display device is a head-mounted display device.

9. The display device of claim 1, wherein the processor is further configured to:
determine that the slow scan period is a non-integer multiple of the fast-scan period of the fast-scan drive signal; and
generate the modified slow-scan drive signal in response to the determination.

10. The display device of claim 1, wherein the display surface includes a first blank region and a second blank region on opposite sides of the active region.

11. A method for use with a display device, the method comprising:
emitting a laser beam from a laser beam emitter;
transmitting a slow-scan drive signal with a slow-scan period to a slow-scan microelectromechanical systems (MEMS) driver configured to drive a slow-scan mirror during a first slow-scan interval;
transmitting a fast-scan drive signal with a fast-scan period to a fast-scan MEMS driver configured to drive a fast-scan mirror;
reflecting the laser beam onto an active region of a display surface during a display interval using the slow-scan mirror and the fast-scan mirror, wherein the first slow-scan interval includes:
a scanning interval in which the slow-scan mirror moves from an initial scanning position to a final scanning position at one or more scanning ramp rates; and
a flyback interval in which the slow-scan mirror returns from the final scanning position to the initial scanning position; and
at a processor, generating a modified slow-scan drive signal at least in part by modifying one or more of:
the initial scanning position;
the final scanning position; and
the one or more scanning ramps rate in a blank region of the display surface, wherein:
the modified slow-scan drive signal has a same slow-scan period as the slow-scan drive signal; and
the modified slow-scan drive signal does not include a substantially instantaneous step change; and
driving the slow-scan mirror with the modified slow-scan drive signal during a second slow-scan interval that occurs subsequently to the first slow-scan interval during operation of the slow-scan MEMS driver, wherein the first slow-scan interval and the second slow-scan interval occur during respective successive frames of a series of frames.

12. The method of claim 11, wherein the flyback interval is traversed at one or more flyback ramp rates, and generating the modified slow-scan drive signal includes modifying the one or more flyback ramp rates.

13. The method of claim 11, wherein generating the modified slow-scan drive signal includes modifying a length of the flyback interval.

14. The method of claim 11, further comprising filtering the slow-scan drive signal with a configurable filter.

15. The method of claim 11, further comprising:
determining that the slow scan period is a non-integer multiple of the fast-scan period of the fast-scan drive signal; and
generating the modified slow-scan drive signal in response to the determination.

16. A display device comprising:
a display surface;
a laser beam emitter configured to emit a laser beam;
a slow-scan microelectromechanical systems (MEMS) driver configured to drive a slow-scan mirror via a slow-scan drive signal with a slow-scan period during a first slow-scan interval;
a fast-scan MEMS driver configured to drive a fast-scan mirror via a fast-scan drive signal with a fast-scan period; and
a processor operatively coupled to the fast-scan MEMS driver and slow-scan MEMS driver;
wherein:
    the slow-scan mirror and the fast-scan mirror are configured to reflect the laser beam onto an active region of the display surface during a display interval;
    the first slow-scan interval includes:
        a scanning interval in which the slow-scan mirror is configured to move from an initial scanning position to a final scanning position at one or more scanning ramp rates; and
        a flyback interval in which the slow-scan mirror is configured to return from the final scanning position to the initial scanning position, wherein the initial scanning position is located in a first blank region on a first side of the active region and the final scanning position is located in a second blank region on a second side of the active region opposite the first side;
    the fast-scan mirror is configured to scan the active region; and
    the processor is configured to:
        generate a modified slow-scan drive signal at least in part by modifying one or more of the initial scanning position and the final scanning position, wherein:
            the modified slow-scan drive signal has a same slow-scan period as the slow-scan drive signal; and
            the modified slow-scan drive signal does not include a substantially instantaneous step change; and
        output, to the slow-scan MEMS driver, instructions to drive the slow-scan mirror with the modified slow-scan drive signal during a second slow-scan interval that occurs subsequently to the first slow-scan interval during operation of the slow-scan MEMS driver, wherein the first slow-scan interval and the second slow-scan interval occur during respective successive frames of a series of frames.

* * * * *